(12) United States Patent
Macor

(10) Patent No.: US 11,673,364 B2
(45) Date of Patent: Jun. 13, 2023

(54) METHOD AND APPARATUS FOR GENERATING A SUPERFICIAL STRUCTURE

(71) Applicant: Giorgio Macor, Martignacco (IT)

(72) Inventor: Giorgio Macor, Martignacco (IT)

( * ) Notice: Subject to any disclaimer, the term of this patent is extended or adjusted under 35 U.S.C. 154(b) by 764 days.

(21) Appl. No.: 16/340,712

(22) PCT Filed: Oct. 13, 2017

(86) PCT No.: PCT/IB2017/056343
§ 371 (c)(1),
(2) Date: Apr. 10, 2019

(87) PCT Pub. No.: WO2018/069874
PCT Pub. Date: Apr. 19, 2018

(65) Prior Publication Data
US 2019/0315087 A1    Oct. 17, 2019

(30) Foreign Application Priority Data

Oct. 13, 2016 (IT) .................. 102016000101385
Mar. 27, 2017 (IT) .................. 102017000033636

(51) Int. Cl.
| | |
|---|---|
| *B32B 3/30* | (2006.01) |
| *B05D 1/36* | (2006.01) |
| *B05D 1/42* | (2006.01) |
| *B05D 3/06* | (2006.01) |
| *B29C 35/08* | (2006.01) |
| *B29C 37/00* | (2006.01) |
| *B32B 38/06* | (2006.01) |
| *B29C 59/02* | (2006.01) |
| *B05D 5/02* | (2006.01) |

(52) U.S. Cl.
CPC .................. *B32B 3/30* (2013.01); *B05D 1/36* (2013.01); *B05D 1/42* (2013.01); *B05D 3/067* (2013.01); *B05D 5/02* (2013.01); *B29C 35/08* (2013.01); *B29C 35/0894* (2013.01); *B29C 37/0053* (2013.01); *B29C 59/022* (2013.01); *B32B 38/06* (2013.01); *B29C 2035/0827* (2013.01); *B29C 2059/023* (2013.01)

(58) Field of Classification Search
CPC . B05D 1/36; B05D 1/42; B05D 3/067; B05D 5/02; B32B 21/042; B32B 2255/08; B32B 2255/26; B32B 2307/402; B32B 2307/554; B32B 2307/584; B32B 2307/75; B32B 2553/00; B32B 3/30; B32B 38/06; B29C 2035/0827; B29C 2059/023; B29C 35/08; B29C 35/0894; B29C 37/0053; B29C 59/022
See application file for complete search history.

(56) References Cited

U.S. PATENT DOCUMENTS

| | | | |
|---|---|---|---|
| 2007/0160790 A1* | 7/2007 | Kaneko .................. | B41J 2/06 427/407.1 |
| 2010/0092688 A1* | 4/2010 | Serbutoviez ............ | B29B 13/08 427/256 |
| 2015/0158241 A1 | 6/2015 | Döhring | |

FOREIGN PATENT DOCUMENTS

WO    WO-2006080362 A1 *    8/2006    .............. B05D 5/02

* cited by examiner

*Primary Examiner* — James M Mellott
(74) *Attorney, Agent, or Firm* — Maschoff Brennan

(57) ABSTRACT

A method and related apparatus for producing an embossing on a substrate using a digital printing technology includes the application of an embossing liquid, for example a water-based liquid, on a non-polymerized resin layer and the subsequent polymerization of the resin with UV curing.

18 Claims, 3 Drawing Sheets

METHOD AND APPARATUS FOR GENERATING A SUPERFICIAL STRUCTURE

FIELD OF THE INVENTION

The present invention relates to a method and apparatus for generating a superficial structure.

In particular, the invention relates to a method for producing an embossed three dimensional coating on a substrate by means of digital printing.

The present invention belongs to the technical field of materials and methods for generating three dimensionality and embossings on surfaces of articles, substrates, supports in different types of material, such as, for example, panels for the production of floors, coatings, furnishings and more generally for architectural and design surfaces. The technology object of the invention may be further used to reproduce microstructures usable in the fields of biology, optics and electronics.

BACKGROUND ART

Digital printing, and in particular inkjet printing, is increasingly establishing itself in industrial sectors, replacing traditional methods based on analog printing. The advantages of digital printing are remarkable and comprise high flexibility, the possibility to produce limited runs and the reduction of waste of consumables.

In particular, the reproduction of wood on various materials is a typical application of digital printing in the production of floors, furniture panels, skirting boards, profiles and in general in the field of design and architecture.

Typically, materials may consist of wood and derived products (MDF/HDF/particleboard/plywood), plastics (PVC/polyolefin), metals, on which the image is printed, which, in turn, is usually protected by a paint so as to increase the abrasion and scratch resistance thereof.

In particular, in the case of floors and furniture panels, the finishing after printing involves the use of a melamine resin layer (laminates) or of a paint applied by means of usual techniques (roller/spray/thin layer/die). The paint may be of various nature, photocurable, epoxy, polyurethane, hot-melt.

When reproducing natural materials, such as wood and stones, beside the image it is necessary to reproduce the superficial structure thereof, in order to obtain a material more similar to the original one also in the touch.

Embossing is usually performed on the superficial layer and may be obtained by various methods, traditionally by means of pressing with molds, rollers or belts on which the structure to be impressed is reproduced. The process may take place by pressing on not completely hardened resins, on thermoplastic materials, on photocurable resins, with simultaneous irradiation and photopolymerization.

With the aim of faithfully reproducing natural materials, a desired feature is to have the embossed structure in register with the printed image, i.e. to obtain correspondence between concavity/convexity and the printed image. With traditional processes, embossing in register is not easy to obtain, both for the precision required and for the need for multiple molds corresponding to the various structures to be printed with the corresponding image.

A method for reproducing the structure in a simple and efficient manner would be even more appropriate with digital printing, which allows to easily produce different images.

In fact, modern scanners used to capture the image of materials, for example METIS DRS 2000, also allow for the simultaneous capture of the superficial structure that may be advantageously used for embossing in register.

Given the widespread use of embossing, it should have simplicity and cost-effectiveness features.

Currently, it is therefore desirable to find new methods for embossing item surfaces, which are quick, easy, applicable in register on surfaces of different materials, as well as cost-effective.

SUMMARY OF THE INVENTION

According to an aspect of the invention, the Applicant has found out a method for producing an embossing on a substrate by means of digital printing technology.

In particular, the method of the invention advantageously provides for the application, by means of digital printing, of an embossing liquid on a portion of a coating or layer of a resin and/or ink and/or paint containing it preferably when the resin has not yet hardened or has partially hardened. The deposition of the embossing liquid may produce concavities or convexities on the resin layer/coating. The embossed resin is then polymerized, typically by means of UV curing, and the embossing liquid is removed. According to some embodiments, the polymerization of the paint and the removal of the embossing liquid may occur simultaneously.

The Applicant has further unexpectedly found out that in the embossing method of the invention it is possible to use water as embossing liquid.

According to a first aspect, the invention therefore relates to a method and an apparatus for generating a three dimensional surface comprising the steps of:

A) applying a paint on the surface of a material,
B) applying a water-based embossing liquid on the paint,
C) polymerizing the paint, preferably by means of UV or EB (electron beam) irradiation,
D) removing the embossing liquid.

Embodiments of the present invention as defined above or as defined in claim 1 are shown below.

The method of the invention reproduces a structure in register in an efficient and cost-effective manner.

Unlike the background art, which for Embossing in Registration (EIR) provides for the engraving of rollers or molds corresponding to the underlying printed image, the method of the invention uses digital printing technology to produce the embossing of the substrate. The method of the invention is flexible and capable of managing individual files.

Furthermore, the embossed structure obtained by the method of the invention has the desired features of resistance and hardness, since the coating itself used for the protection of the substrate is embossed, as in the case of panels used in floorings or in furniture or in design furnishings.

The versatility and the resolution obtainable by the method of the invention allows for the use thereof also in applications where microstructures typical of the field of microfluidics are used.

DETAILED DESCRIPTION OF THE INVENTION

Figure 1:
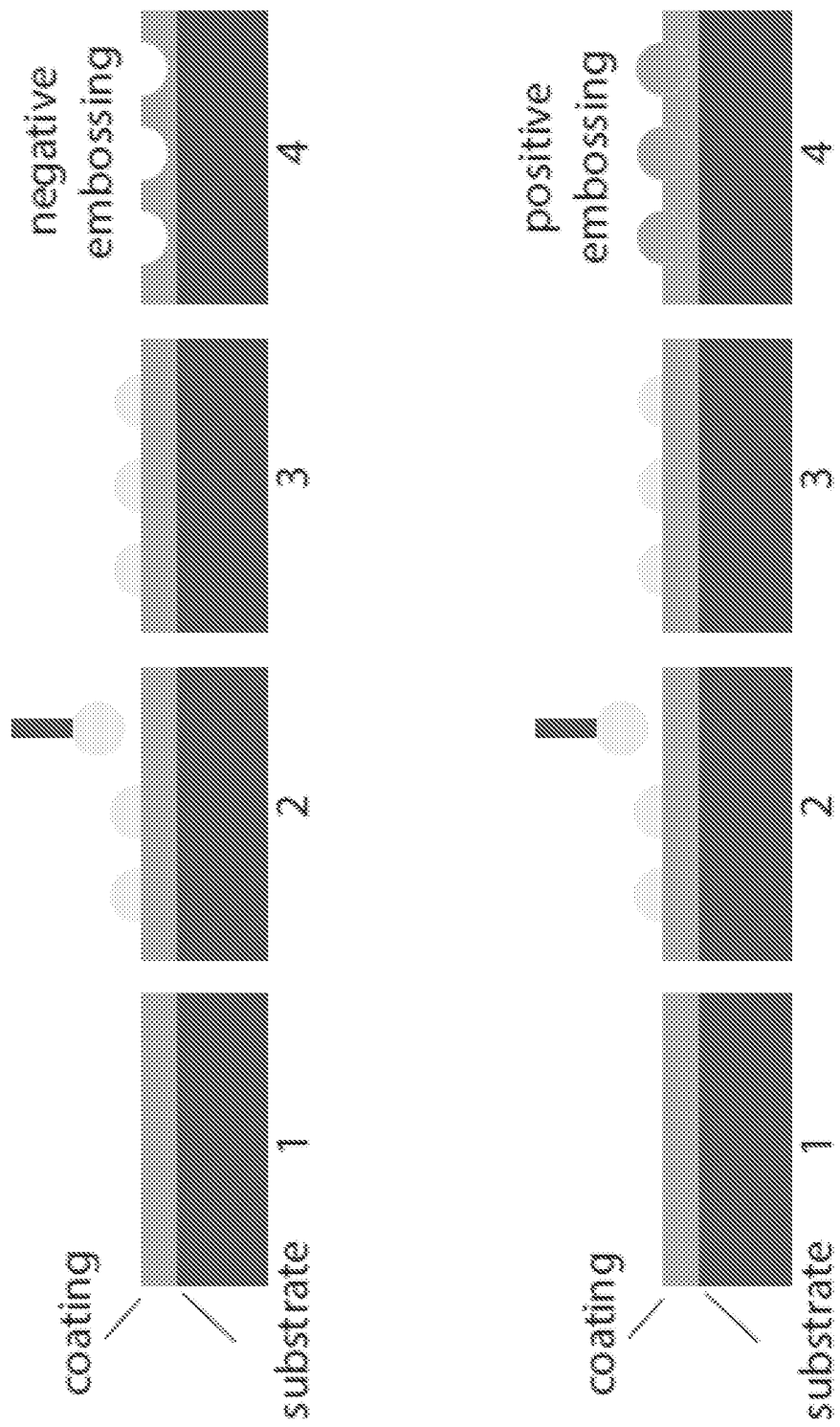
FIG. 1 shows two schematic reproductions of steps A)-C) of the process of the invention with the obtainment of a substrate with negative embossing and positive embossing.

According to an aspect, the present invention relates to a method for producing a three dimensional embossed coating on a substrate comprising the steps of:
A) applying a non-polymerized photocurable resin, or a paint or ink containing it, on the surface of a substrate thus forming a coating;
B) applying a water-based embossing liquid on at least one portion of the coating;
C) polymerizing the photocurable resin by means of irradiation with UV or EB beams (electron beam);
D) optionally removing the embossing liquid.

Within the scope of the invention, the inks and/or paints employed are suitable for the coating of substrates to be decorated.

Typically, the coating layer resin may be of a various chemical nature such as, for example, a melamine, polyurethane, epoxy resin and preferably a photocurable resin.

Preferably, the resin has a high solid content, for example equal to 20-30% by weight with respect to the weight of the resin, so as to maximize the embossable layer and vanish the effect of the embossing liquid due to the evaporation of the solvent, if any.

Preferably, the resins used are photocurable.

For example, photocurable resins may be divided in two types, on the basis of the curing mechanism: 1) radical, typically acrylate resins and vinyl monomers 2) cationic resins, such as epoxy, polyols and monomers such as oxetans and vinyl ethers.

Type 1 may be divided in different subcategories: epoxy acrylates, urethane acrylates, polyester acrylates, polyether acrylates, amino acrylates, silicone acrylates, polyisoprene acrylates, polybutadiene acrylates and acrylate monomers. The term acrylates means both acrylate and methacrylate resins.

Vinyl monomers include N-vinyl caprolactam (NVC), acryloyl morpholine (ACMO), diethylene glycol divinyl ether (DVE-2), triethylene glycol divinyl ether (DVE-3) and mixtures thereof.

The previously described resins are associated in that they polymerize and harden by virtue of the energy irradiated by ultraviolet beam devices.

In a preferred embodiment of the invention, the coating layer paint comprises one or more photocurable resins, photoinitiators, fillers, such as, for example, aluminum oxide, to increase the abrasion resistance thereof, talc to modify the rheology thereof, silica to reduce the brilliance thereof, calcium carbonate and other additives, for example, leveling agents, wetting agents, slip agents, rheology modifiers, commonly used to protect floor and furniture surfaces from wear, scratches and abrasions.

Advantageously, the photocurable resin contains silicones which are capable of increasing the depth of the embossing. Typically, silicones are added from 0.01% to 20%, from 0.01% to 10%, from 0.01% to 2%. The various usable products include silicones, silicone polyethers, silicone acrylates, silicone polyether acrylates.

With the same effect, the formulation of the photocurable resin may contain rheology modifiers, such as thixotropic agents, which have the function of maintaining the embossing shape better, both in terms of depth and of definition.

Typically, the resin used is a photocurable resin and the photocuring is obtained by means of conventional technology, as described, for example, in the book "Radiation Curing: Science and Technology" (Pappas).

In a preferred embodiment of the invention, the coating layer is a photocurable printing paint and/or a photocurable printing ink applied by means of digital printing.

The substrate usable in the method of the invention may be a material of a different nature, such as wood and derived products, for example MDF, HDF, particleboard, multilayer wood, cellulose-based materials, such as paper or cardboard, metals, plastic material, stone, glass, ceramic and composite thereof.

The substrate is selected depending on the application of the method of the invention, for example for the coating of furniture, floors, fixtures, profiles.

In an embodiment, the embossing liquid is water-based. This liquid has the advantage of having a high surface tension, of being easily removable and of being cost-effective.

In some embodiments, the water-based embossing liquid contains additives which serve to modify properties thereof, such as surface tension and/or rheology and/or printability and/or color.

In particular, the addition of surface tension modifiers helps stabilizing the liquid and improves the printability, especially when using inkjet printers.

In some embodiments, the embossing liquid comprises silicones or silicone acrylates. The presence of silicones improves the embossability and provides a natural appearance to the treated coating, which may be particularly appreciated from an aesthetic point of view.

The various usable products include silicones, silicone polyethers, silicone acrylates, silicone polyether acrylates.

According to some embodiments, the embossing liquid may contain further substances adapted to improve the embossing effect and/or impart different functionalities beyond the embossing and may comprise photoinitiators, leveling agents, oils, light stabilizers, antioxidants, biocides, pigments, rheology modifiers, humectants, antifoams and mixtures thereof.

The control of the embossing depth or the embossed layer thickness may be modulated in different manners, either by applying more embossing liquid, or by increasing or decreasing time between the application of the embossing liquid and the subsequent polymerization of the paint. Thereby, by acting more or less the embossing liquid, more or less deep embossings may be obtained, which are both negative (concavities) and positive (convexities).

Preferably, to create a neat and precise effect, the embossing liquid has a surface tension higher than the paint to be embossed, while in other cases the surface tension may be lowered to obtain a more gentle embossment.

The substrate layer/coating has a variable thickness.

By way of example, the coating may have a thickness in the range from 1 to 400 µ, from 2 to 100 µ, from 3 to 50 µ in the portion without embossings, and a thickness in the range of 0.05 to 100 µ, 0.5 to 50 µ, 1 to 25 µ in the embossed areas.

Figure 2:
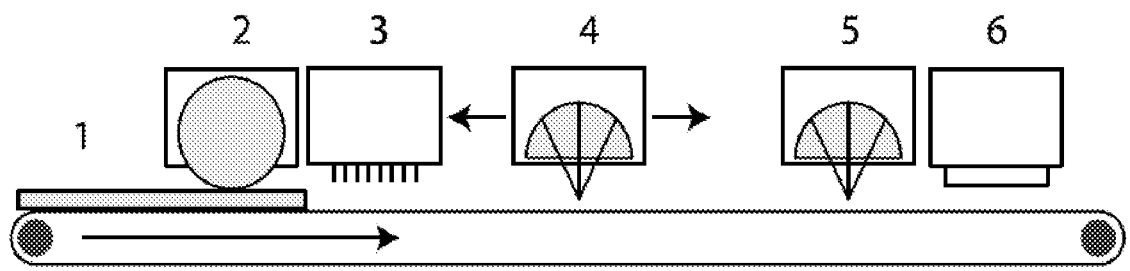
FIG. 2 shows an embodiment of an apparatus for reproducing the method of the invention.

The process of the invention and the apparatus for the achievement thereof will become more apparent from the following description, in which reference is made to the embodiments shown in the accompanying FIGS. 1 and 2.

According to some embodiments, the resin or paint or ink containing it to be embossed may be applied on the substrate by means of digital technology, for example, as shown in FIG. 2, point 2, using inkjet printing or by means of conventional techniques in use, such as roller/spray/thin layer/die/slot-die.

In some embodiments of the invention, the application of the embossing liquid takes place on the resin or paint or ink that contain it, not hardened, of an underlying printed image.

Typically, photopolymerization by UV irradiation may be performed by means of one or more Hg lamps and/or LED lamps, as shown, for example, in FIG. 2, point 5. Preferably, the lamps are mounted on a mobile system, which allows to bring them more or less closer to the embossing liquid application system, so as to better control the action thereof and thereby modulate the effect thereof. For example, to obtain a dull matt effect, the pre-polymerization/polymerization shall take place immediately after the inkjet application, as shown in FIG. 2, point 4.

The removal of the embossing liquid may take place simultaneously to the photopolymerization as shown in FIG. 2, point 5, as the UV lamp emits heat, or may take place at a distinct step. In such case, the removal of the embossing liquid (step D) may be performed by means of the usual technologies adapted to make the water evaporate, such as, for example, infrared beams or hot air irradiation.

In another embodiment of the invention, the application of the embossing liquid is performed in two distinct steps, and this allows, for example, to obtain combined effects by using two embossing liquids.

Typically, the method of the invention provides for the application of the embossing liquid by means of an inkjet printhead.

Inkjet printing may be either in multipass/scanning mode, where the image is generated with multiple passages of the printhead while the material to be printed advances, or in singlepass mode, where the material to be printed passes only once under the printheads which are installed along the maximum width of the material itself. Singlepass printing is used for large runs, while multipass printing is definitely the most common one.

Typically, inkjet printing provides for the use of a printhead to create and lay the liquid droplets that will then form the image to be printed. By way of example, details of this type of printing may be found in the book "Fundamentals of inkjet printing: the science of inkjet and droplets" (Hoath, Stephen).

Depending on the inkjet printhead used, the droplets produced may have different volumes and consequently different diameters. By way of example, the following table shows the volume of the drop and the corresponding diameter.

TABLE 1

| VOLUME (pl) | DIAMETER (µ) | VOLUME Lev. 1 (pl) | VOLUME Lev. 2 (pl) | VOLUME Lev. 3 (pl) |
|---|---|---|---|---|
| 1.5 | 3 | 1.5 | 3 | 4.5 |
| 2.4 | 5 | 2.4 | 4.8 | 7.2 |
| 3 | 6 | 3 | 6 | 9 |
| 6 | 13 | 6 | 12 | 18 |
| 10 | 21 | 10 | 20 | 30 |
| 12 | 25 | 12 | 24 | 36 |
| 30 | 64 | 30 | 60 | 90 |
| 80 | 170 | 80 | 160 | 240 |

In addition to the native size of the drop, which is an intrinsic feature of the printhead, larger drops may be generated by the printhead itself. For example, a printhead capable of laying 4 levels of gray will have the smallest drop measuring 6 pl while the largest will measure 18 pl (Table 1).

Advantageously, the application of small drops may be used to generate microgrooves and microwells measuring a few microns, typical of microfluidics, for the production of sensors and functional devices.

A further application of the small drops allows for the generation of microstructures, which make the surface of the embossed paint/resin/ink matt. With this latter application, glossy and matt surfaces may be obtained simultaneously, with interesting aesthetic effects.

In another embodiment of the invention, the resin to be embossed may contain expanding agents so as to obtain high embossing volumes, while limiting the weight of the embossed layer and/or the cost. Typically, hollow polymeric microspheres filled with gas may be used, which, at certain temperatures, increase in volume; for example EXPANCELs may be used. The expansion step preferably takes place prior to the application of the embossing liquid.

In addition to reproducing natural materials such as wood and stones, the method of the invention may also be used to generate three dimensional structures, typical of the graphic and/or decorative field.

Advantageously, the method of the invention may be used to emboss printed surfaces in a traditional manner (rotogravure/flexo/offset).

The following embodiments are provided purely for the purpose of illustrating the present invention and are not intended to limit the scope of protection defined by the appended claims.

EXAMPLE 1

Figure 3:
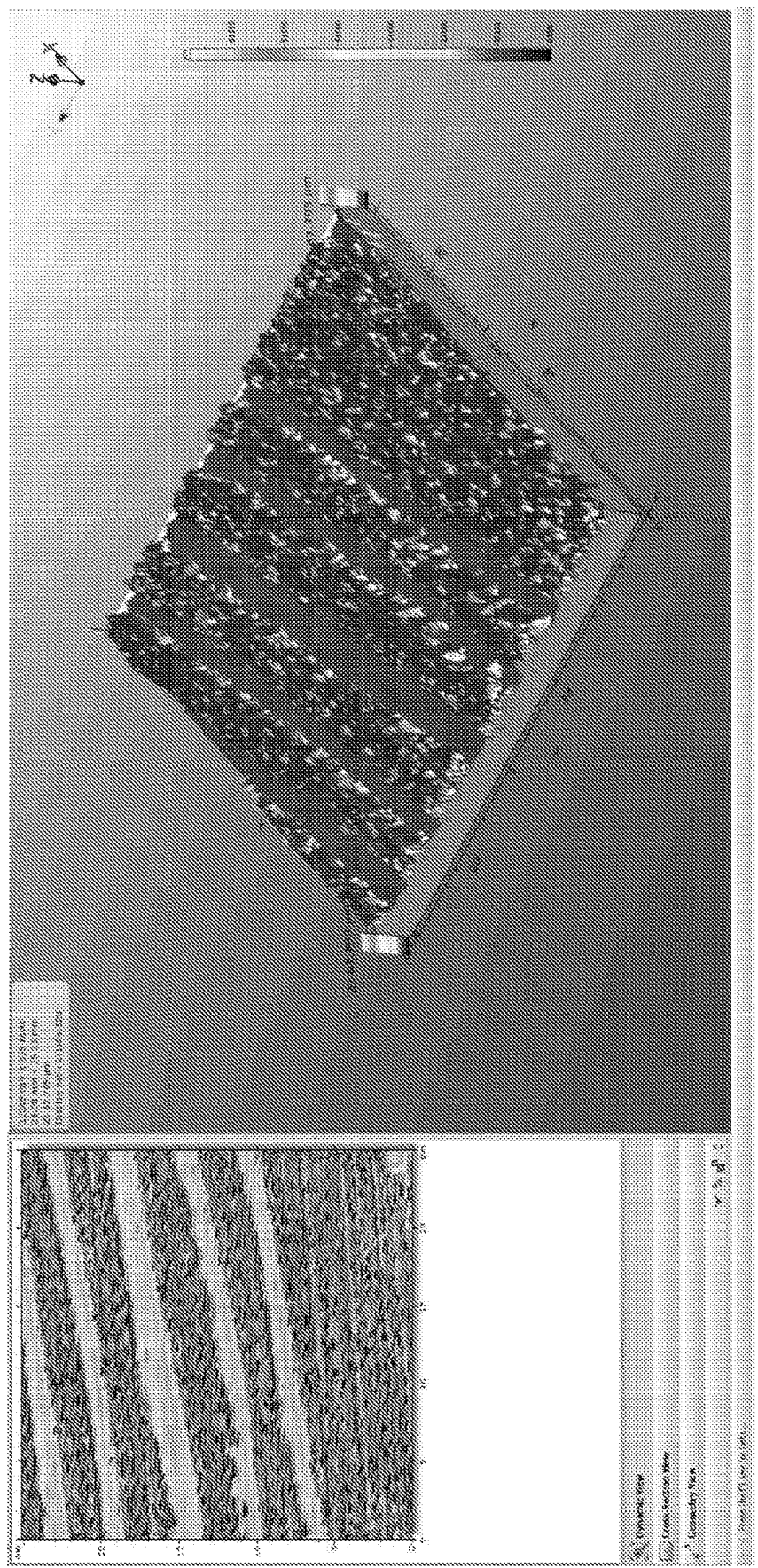
FIG. 3 shows, by means of the laser profilometer analysis, a substrate with a decorative superficial embossing obtained by the method described in Example 1.

50 g/sqm of photocurable paint (Renner UO-240) for finishing floors were applied in line at 15 m/min to a MDF panel, by means of a paint roller. Subsequently, the panel was passed under an inkjet printer of the singlepass type, with which the embossing liquid consisting of $H_2O+2\%$ of TEGO RAD 2100 (acrylate silicone) was applied. After the application, the convexities produced by the embossing liquid on the paint become apparent. The printer used (CEFLA) was equipped with DIMATIX STARFIRE 1024 printheads, while the printed image was obtained from a three dimensional scan, performed with a scanner (METIS), of a natural oak section. The image was then uploaded to the printer by means of the dedicated software (RIP). Subsequently, the panel was irradiated with 160 w/cm ultraviolet light generated by a medium-pressure Hg lamp. In addition to the UV beams, the lamp generates heat, which in this case is sufficient to make the water contained in the embossing liquid evaporate while the acrylate silicone contained in the embossing liquid is polymerized by means of the UV lamp. Following the photopolymerization, the resin is dry and hard to the touch, with the printed woodgrain impressed, the embossing is well defined and detailed exactly like the scanned natural material. The structure is best seen by means of the laser profilometer analysis (3D profiler—USA), as shown in FIG. 3.

EXAMPLE 2

A photocurable gray varnish (100 g/sqm) was applied to a support material. Subsequently, the support was passed under an inkjet printer of the singlepass type equipped with DIMATIX STARFIRE 1024S printheads, with which the embossing liquid consisting of $H_2O$ was applied. The support was then irradiated with 160 w/cm ultraviolet light generated by a medium-pressure Hg lamp. On the surface, the printed image consisting of a text with variable fonts is well apparent.

EXAMPLE 3

A high gloss photocurable paint (Renner UO-240) was applied to a support material.

The support was passed under an inkjet printer of the singlepass type equipped with DIMATIX STARFIRE 1024S printheads, the smallest drop of which is 10 pl, with which the embossing liquid consisting of $H_2O$ was applied using only the smallest drops. The support was then immediately irradiated with a 395 nm 8 w/cm² PHOSEON FIRELINE lamp and subsequently with a 160 w/cm medium-pressure DR. Hönle Hg lamp to complete the polymerization of the paint. The paint is homogeneously matt due to the microstructure generated by the microdrops laid by the inkjet printhead. The original paint was in fact equal to 85 gloss units, while, following the application, the paint was equal to 35 gloss units.

EXAMPLE 4

20μ of a photocurable formulation were applied to a support material (PET).

The support was passed under an inkjet printer of the multipass type, with which the embossing liquid consisting of $H_2O$+2% of PEG600DA (acrylate monomer) was applied only using the smallest drops. The printhead used was a DIMATIX STARFIRE 1024S, the smallest drop of which measures 10 pl. The support was immediately irradiated with ultraviolet light generated by a 8 w/cm² PHOSEON FIRELINE lamp). Subsequently, a photocurable formulation was completely polymerized by means of irradiation with ultraviolet light generated by a 160 w/cm medium-pressure DR. Hönle Hg lamp. The surface appears hard, with microgrooves and microwells measuring variably from 12 to 25 microns, which can be clearly identified using a Dino Lite 4113 microscope.

The invention claimed is:

1. A method for producing a three dimensional surface on a substrate comprising the steps of:
    A) applying a photocurable resin, or a paint or ink containing the photocurable resin, on a surface of a substrate, thus forming a coating;
    B) applying a water-based embossing liquid on a portion of the coating;
    C) polymerizing the photocurable resin by irradiation with UV beams; and
    D) removing the embossing liquid,
    wherein the photocurable resin comprises one or more expanding agents, which are expanded prior to the applying of the embossing liquid.

2. The method according to claim 1, wherein the photocurable resin is configured to be polymerized in a radical and/or cationic way.

3. The method according to claim 2 wherein the photocurable resin is selected from the group consisting of acrylate resins, acrylate monomers, vinyl monomers and mixtures thereof, epoxy resins, polyols, oxetanic monomers, vinyl monomers, and mixtures thereof.

4. The method according to claim 2, wherein the photocurable resin is selected from the group consisting of epoxy acrylates, urethane acrylates, polyester acrylates, polyether acrylates, amino acrylates, silicone acrylates, polyisoprene acrylates, polybutadiene acrylates, acrylate monomers and mixtures thereof, and vinyl resins are selected from the group consisting of N-vinyl caprolactam (NVC), acryloyl morpholine (ACMO), diethylene glycol divinyl ether (DVE-2), and triethylene glycol divinyl ether (DVE-3) and mixtures thereof.

5. The method according to claim 1, wherein the embossing liquid is water-based or consists of water.

6. The method according to claim 5 wherein the embossing liquid contains at least one substance selected from the group consisting of surface tension modifiers, acrylic resins, photocurable resins, photoinitiators, slip agents, wetting agents, oils, light stabilizers, antioxidants, antifoams, humectants, biocides, colorants, fillers, and pigments and mixtures thereof.

7. The method according to claim 1, wherein the embossing liquid has a higher surface tension than a paint to be embossed.

8. The method according to claim 1, wherein said photocurable resin is contained in a colored and/or pigmented paint.

9. The method according to claim 1, wherein the embossing liquid is applied with an inkjet printhead.

10. The method according to claim 1, wherein the embossing liquid is applied in two or more distinct steps using different inkjet printing systems.

11. The method according to claim 1, wherein the method comprises embossing performed in line with a printing and finishing of a material.

12. The method according to claim 1, wherein the method comprises embossing applied in register with a printed image.

13. The method according to claim 1, wherein the steps of polymerizing the photocurable resin or of the paint containing the photocurable resin and of removing of the embossing liquid takes place simultaneously.

14. The method according to claim 1, wherein the step of polymerizing the photocurable resin or of the paint containing the photocurable resin takes place in several distinct steps, comprising a first pre-polymerization/gelation step and, subsequently, a polymerization step.

15. The method according to claim 1, further comprising the step of generating a matt surface.

16. The method according to claim 1, further comprising the step of generating glossy and matt areas simultaneously on a surface of the paint.

17. The method according to claim 1, further comprising the step of generating an embossed surface, and wherein, after removal of the embossing liquid, a cover paint is applied on the embossed surface so as to provide further protection and/or to matt the embossed surface.

18. A method for producing a three dimensional surface on a substrate comprising the steps of:
    A) applying a photocurable resin, or a paint or ink containing the photocurable resin, on a surface of a substrate, thus forming a coating;
    B) applying a water-based embossing liquid on a portion of the coating;
    C) polymerizing the photocurable resin by irradiation with UV beams; and
    D) removing the embossing liquid,
    wherein the embossing liquid comprises silicones and/or silicone acrylates.

* * * * *